(12) United States Patent
Gantman et al.

(10) Patent No.: US 7,836,308 B2
(45) Date of Patent: *Nov. 16, 2010

(54) APPARATUS AND METHOD FOR MULTIPLE FUNCTION AUTHENTICATION DEVICE

(75) Inventors: Alexander Gantman, Poway, CA (US); Gregory G. Rose, Concord (AU); Jack Steenstra, San Diego, CA (US); John W. Noerenberg, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 887 days.

This patent is subject to a terminal disclaimer.

(21) Appl. No.: 10/873,656

(22) Filed: Jun. 21, 2004

(65) Prior Publication Data
US 2005/0010777 A1 Jan. 13, 2005

Related U.S. Application Data

(60) Provisional application No. 60/480,134, filed on Jun. 19, 2003.

(51) Int. Cl.
*H04L 9/32* (2006.01)

(52) U.S. Cl. ............ 713/176; 713/168; 713/170; 705/57; 705/76

(58) Field of Classification Search .......... None
See application file for complete search history.

(56) References Cited

U.S. PATENT DOCUMENTS

| 5,481,611 | A * | 1/1996 | Owens et al. ........ 713/159 |
| 5,784,464 | A | 7/1998 | Akiyama et al. |
| 5,953,700 | A | 9/1999 | Kanevsky et al. |
| 6,236,724 | B1 | 5/2001 | Labaton et al. |
| 6,607,136 | B1 * | 8/2003 | Atsmon et al. ........ 235/492 |
| 6,615,171 | B1 * | 9/2003 | Kanevsky et al. ...... 704/246 |
| 7,083,090 | B2 * | 8/2006 | Zuili .................. 235/383 |
| 7,181,621 | B2 * | 2/2007 | Labaton ............... 713/176 |
| 7,349,481 | B2 * | 3/2008 | Steentra et al. ....... 375/260 |
| 2002/0016908 | A1 | 2/2002 | Tanaka |
| 2003/0079141 | A1 | 4/2003 | Eitel et al. |
| 2004/0085188 | A1 | 5/2004 | Minemura |
| 2004/0123113 | A1 | 6/2004 | Mathiassen et al. |

(Continued)

FOREIGN PATENT DOCUMENTS

CN 1229229 A 9/1999

(Continued)

OTHER PUBLICATIONS

OA Dated May 15, 2009 for CN Application No. 200480023599.5, 40 pages.

(Continued)

*Primary Examiner*—Pramila Parthasarathy
(74) *Attorney, Agent, or Firm*—Turocy & Watson, LLP

(57) ABSTRACT

Apparatus and method for authentication is disclosed. In one embodiment, an apparatus for performing authentication using removeably coupled external authentication module comprises a module configured to receive the authentication module. The authentication module is configured to generate authentication information. The module may comprises an input unit configured to receive and couple the authentication module, and an output unit configured to receive the authentication information from the authentication module and to transmit the authentication information.

36 Claims, 4 Drawing Sheets

U.S. PATENT DOCUMENTS

2004/0207721 A1 10/2004 Yoon et al.

FOREIGN PATENT DOCUMENTS

| JP | 59-133769 | | 8/1984 |
|----|-----------|---|--------|
| JP | 62-43943 | | 2/1987 |
| JP | 62043943 | A | 2/1987 |
| JP | 6-46162 | | 2/1994 |
| WO | 96/31971 | A1 | 10/1996 |
| WO | 96/34483 | A1 | 10/1996 |
| WO | 9631971 | A1 | 10/1996 |
| WO | 0146775 | A2 | 6/2001 |
| WO | 01/57619 | A2 | 8/2001 |

OTHER PUBLICATIONS

OA Dated Jun. 24, 2009 for AU Application No. 2004250720, 5 pages.

International Search Report dated Apr. 5, 2005 for PCT Application Serial No. PCT/US04/19960, 2 Pages.

European Search Report dated Jun. 8, 2009 for EP Application Serial No. 04 77 6915, 3 Pages.

Office Action mailed Jul. 31, 2008 for Russian Patent Application Serial No. 2006101409/09, 2 Pages.

Office Action mailed Aug. 27, 2008 for Indian Patent Application Serial No. 3441/CHENP/2005 2 Pages.

Chinese Office Action dated Jan. 5, 2010 for Chinese Application Serial No. 200480023599.5, 38 pages.

European Office Action dated Nov. 12, 2009 for European Application Serial No. 04776915.3, 6 pages.

Japanese Office Action mailed Aug. 24, 2010 for Japanese Application Serial No. 2006-517528, 5 pages.

Australian Office Action mailed Jul. 26, 2010 for Australian Application Serial No. 2004250720, 2 pages.

\* cited by examiner

APPARATUS AND METHOD FOR MULTIPLE FUNCTION AUTHENTICATION DEVICE

CROSS-REFERENCE TO RELATED APPLICATIONS

The present application for patent claims priority to Provisional Application No. 60/480,134 entitled "Apparatus and Method for Multiple Function Authentication Device" filed Jun. 19, 2003, and assigned to the assignee hereof and hereby expressly incorporated by reference herein.

This application is related to the following, all of which are assigned to the same assignee of this application.

Co-pending U.S. application Ser. No. 09/611,569 filed Feb. 15, 2002 and entitled "Method and Apparatus for Secure Identity Authentication With Audible Tones."

Co-pending U.S. application Ser. No. 10/077,365 filed Feb. 15, 2002 and entitled "Method and Apparatus for Simplified Audio Authentication."

Co-pending U.S. application Ser. No. 10/139,873 filed May 6, 2002 and entitled "System and Method for Acoustic Two Factor Authentication."

Co-pending U.S. application Ser. No. 10/356,144 filed Jan. 30, 2003 and entitled "Wireless Communication Using Sound."

Co-pending U.S. application Ser. No. 10/356,425 filed Jan. 30, 2003 and entitled "Communication Using Audible Tones."

BACKGROUND

I. Field of Invention

The invention generally relates to authentication systems and more particularly, authentication systems using a modifiable apparatus.

II. Description of the Related Art

Access to the Internet and use of electronic data systems have grown steadily among the general public. Electronic commerce has been eagerly embraced by both consumers and businesses due to the relative ease with which one party can purchase or sell to another party without the inherent complications involved with running a "bricks and mortar" establishment. For example, users may gain access to banks (on-line or by automatic teller machines (ATM)), a private network such as an intranet, a secure server or database, and/or other virtual private network (VPN) over a public communication network or infrastructure by digital authentication.

However, with the introduction of a system of communication wherein face-to-face contact is eliminated or greatly reduced, opportunities for fraudulent activity have increased. A stolen credit card in the hands of a wrong-doer can cause damage to the credit rating of the named credit card holder and cause damage for the credit card issuer who must absorb the loss resulting from unauthorized purchases. In a worst-case scenario, a wrong-doer may actually purloin a party's identity in order to exploit the credit-worthiness and financial accounts of that party. Such an activity leaves the wronged party in the untenable position of defending himself or herself against any criminal activity perpetrated in his or her name, denying activities conducted at the businesses of deceived creditors, or re-establishing a new identity with the authorities.

To prevent unauthorized access, various security schemes have been developed to verify user or entity identification such that only authorized entities are given access. One technique for user authentication and access control can be implemented by a access code generating device, such as a token. Generally, a user is provided with a token having a unique secure information. The token displays a unique access code that is periodically generated. Also, the access code may be registered and/or associated with the user in one or more network(s) to establish an identity. Typically, the access code is generated from an algorithm that is based on the secure information and the current time. The user is then required to input the currently displayed access code to gain access to the one or more network(s).

While a token as described above may prevent unauthorized access, it is simple with limited functions. Accordingly, in other tokens, different function(s) may be implemented. For example, another layer of security may be provided by implementing a user interface such that the user must enter a correct password or a personal identification number (PIN) to activate the token. However, if a user wishes to exchange and/or add different functions on a token, such as for example a user interface, the user must acquire a whole new token with the desired functions.

A new token generates a different access code that corresponds to secure information in the new token. Therefore, the access code must be re-registered and/or re-associated with the user in each of the one or more network(s). This can be cumbersome and create inconvenience to users, thereby discouraging users to upgrade and/or exchange a token. Accordingly, there is a need for a more efficient, more convenient and/or user friendly way to implement a device for authentication.

SUMMARY

Embodiments disclosed herein address the above stated needs by providing an expandable and/or replaceable apparatus for performing electronic authentication. Generally, the apparatus implements a module that securely transmits one or more authentication information, such as digital signatures, for electronic authentication. In some embodiments, the module may be configured to transmit one or more access codes, such as passwords or PINs, for electronic authentication. The appropriate verifier can then receive and authenticate the authentication information to verify the identity, source or origin of the user of the module. Thereafter, if required, the user may be granted or denied access to a private network or system.

More particularly, the module comprises a secure storage medium and a processor that generate the authentication information, such as the digital signature, based on a unique cryptographic information stored in the storage medium. The module also comprises an output unit that transmits the authentication information. The output unit may comprise a sound component that transmits the authentication information by emitting sound tones associated with the digital signature or access code.

Accordingly, the embodiments disclosed allow a more convenient electronic authentication as well as a more convenient way for a user to modify or upgrade the apparatus for the electronic authentication. In one aspect, an apparatus for performing authentication using removeably coupled external authentication module is disclosed. The authentication module is configured to generate authentication information. The apparatus comprises an input unit configured to receive the authentication module; and an output unit coupled to the input unit, configured to receive the authentication information from the authentication module and to transmit the authentication information. The output unit may be a sound component configured to receive the authentication information from the authentication module and to emit sound tones associated with the authentication information. The apparatus may comprise a housing module comprising the input unit and the output unit to receive and to transmit the authentication information.

In another aspect, a user replaceable module for performing authentication using authentication information received from an external authentication module is disclosed. The authentication module is configured to generate the authentication information. The module comprise an input unit configured to removeably couple to the authentication module; an output unit coupled to the input unit, configured to receive the authentication information and to transmit the authentication information; and an actuator coupled to the output unit, configured to cause the output unit to transmit the authentication information. The output unit may comprise a sound component configured to receive the authentication information, convert the authentication information into sound tones, and to emit sound tones associated with the authentication information.

In the apparatus and/or module, the sound component may comprise a conversion unit coupled to the input unit, configured to receive the authentication information and convert the authentication information into sound tones; and a sound generation unit coupled to the conversion unit, configured to emit sound tones associated with the authentication information. The sound component may further comprise a sound reception unit coupled to the conversion unit, configured to receive an external signal, wherein the conversion unit is configured to convert the external signal into data used for generating the authentication information.

In still another aspect, an authentication module for authenticating a user is disclosed. The module has an output unit, wherein the output unit is configured to transmit the authentication information. The authentication module comprises an input unit for removeably coupling to a user-replaceable module and for receiving information from the user-replaceable module, a storage medium configured to maintain a cryptographic key; and a processor coupled to the storage medium, configured to generate the authentication information using the cryptographic key and the information from the user-replaceable module.

In a further aspect, a method for performing authentication using removeably coupled external authentication module configured to generate authentication information comprises configuring an input unit to receive and couple the authentication module; and implementing the input unit in a user replaceable module configured to receive the authentication information and to transmit the authentication information. Transmission of the authentication information may comprise emitting sound tones associated with the authentication information.

In still a further aspect, a user replaceable module for performing authentication using authentication information received from an external authentication module is disclosed. The authentication module is configured to generate the authentication information. The comprises means for removeably coupling to the authentication module; means for receiving the authentication information; and means for transmitting the authentication information. The means for transmitting may comprise means for converting the authentication information into sound tones; and means for emitting sound tones associated with the authentication information. The module may further comprise means for receiving an external signal; and means for converting the external signal into data used for generating the authentication information.

In the apparatus and methods disclosed, the sound tones may comprise audible tones. The sound tones may comprise infrasonic tones. The sound tones may comprise ultrasonic tones. Also, the authentication information may comprise a digital signature. The authentication information may comprise an access code. Moreover, the module may further comprise a display.

In other aspects, means for maintaining cryptographic information is separated from the means for transmitting the cryptographic information. An apparatus for performing authentication comprises an authentication module configured to generate a digital signature; and a module embedding the authentication module. The module comprises a sound component coupled to the authentication module and configured to emit sound tones associated with the digital signature. The authentication module is removable from the module. Also, the authentication module may comprise a storage medium configured to maintain a cryptographic key; and a processor coupled to the storage medium and configured generate the digital signature using the cryptographic key. The sound component may comprise a sound generation unit configured to emit sound tones associated with the digital signature, and may further comprise a sound reception unit configured to receive an external signal and wherein the authentication module generates the digital signature based on the external signal.

In still other aspects, apparatus for performing authentication comprises an authentication module configured to generate a first digital signature; and a replaceable module embedding the authentication module. The replaceable module comprises a sound component coupled to the authentication module and configured to generate sound waves associated with the first digital signature. Also, the authentication module may comprise a storage medium configured to maintain a cryptographic key; and a processor coupled to the storage medium and configured generate the digital signature using the cryptographic key.

Furthermore, a plurality of cryptographic keys may be maintained wherein the digital signature is generated from one of the plurality of cryptographic keys; and wherein each one of the plurality of cryptographic signatures has associated sound tones. Also, the module may comprise a power source configured to provide power to the authentication module. In addition, the sound tones may comprise audible tones. The sound tones may comprise infrasonic tones. The sound tones may comprise ultrasonic tones.

BRIEF DESCRIPTION OF THE DRAWINGS

Various embodiments will be described in detail with reference to the following drawings in which like reference numerals refer to like elements, wherein.

DETAILED DESCRIPTION

Figure 1:
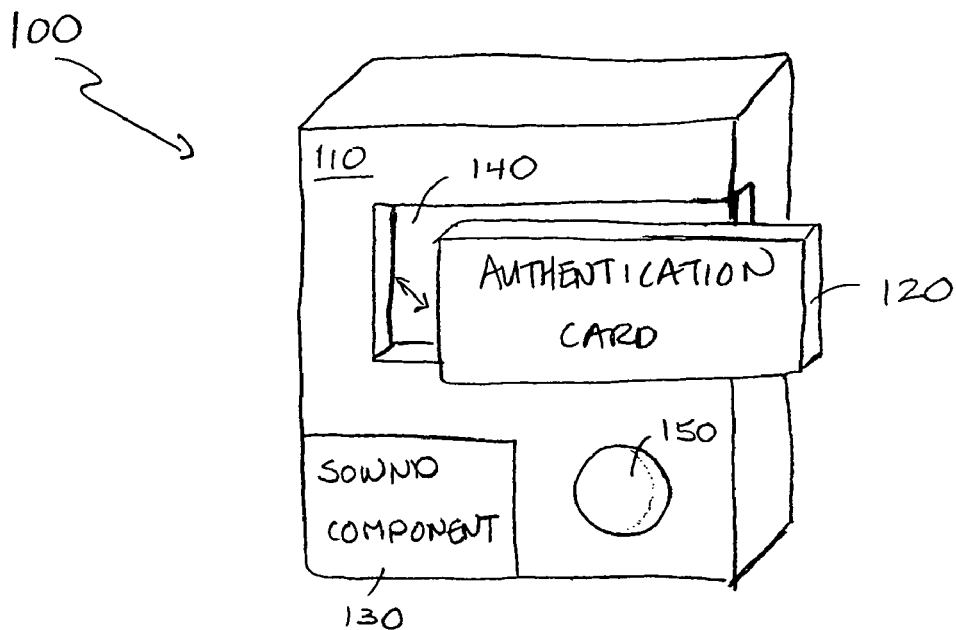
FIG. 1 show an example embodiment of an apparatus for authentication.

Embodiments disclosed allow an expandable and/or upgradeable apparatus for use in authentication. In the disclosed embodiments, the apparatus is split into at least two parts. More particularly, authentication information, such as digital signature(s), is generated within a separate entity, hereinafter called "authentication module." The authentication module may then be placed in various devices and/or apparatus capable of transmitting the generated authentication information, such as digital signature(s). Therefore, users may easily, conveniently and/or inexpensively add and remove functions as desired to the device and/or apparatus. Also, it should be noted that the authentication module may also be configured to transmit an access code, such as a password or PIN, as well as digital signatures and other information used for authentication, hereinafter called "authentication information," that allows a user to access a private database, network, or system.

In one embodiment, authentication information may be transmitted using sound waves. Co-pending U.S. application Ser. No. 09/611,569 discloses an apparatus for performing authentication by generating audible tones associated with an authentication information. For purposes of explanation, the authentication information in the embodiments below will be transmitted using sound. Generally, the disclosed apparatus then comprises a storage element and sound component coupled to a processor to generate the audible tones. However, it should be noted that the authentication information may be transmitted using any known techniques as allowed by the implementations in an apparatus. Therefore, the scope of the invention should not be limited to transmission of authentication information using sound.

As disclosed herein, the term "sound wave" refers to acoustic wave or pressure waves or vibrations traveling through gas, liquid or solid. Sound waves include ultrasonic, audio and infrasonic waves. The term "audio wave" refers to sound wave frequencies lying within the audible spectrum, which is approximately 20 Hz to 20 kHz. The term "ultrasonic wave" refers to sound wave frequencies lying above the audible spectrum and the term "infrasonic wave" refers to sound wave frequencies lying below the audible spectrum. The term "tone" refers to sound wave(s) of certain pitch and vibration. Accordingly, the term "audible tone" refers to audio wave(s) of certain pitch and vibration, "ultrasonic tone" refers to ultrasonic wave(s) of certain pitch and vibration, and "infrasonic tone" refers to infrasonic wave(s) of certain pitch and vibration. The term "storage medium" represents one or more devices for storing data, including read only memory (ROM), random access memory (RAM), magnetic disk storage mediums, optical storage mediums, flash memory devices and/or other machine readable mediums for storing information. The term "machine readable medium" includes, but is not limited to, portable or fixed storage devices, optical storage devices, wireless channels and various other devices capable of storing, containing or carrying instruction(s) and/or data. The term "module" refers to a self contained device, component, unit or item. A module may be used in combination with other components, units or items.

Also, it is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Furthermore, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

FIG. 1 shows an example apparatus 100 for performing authentication. Apparatus 100 comprises a housing module 110 configured to receive or embed an authentication module 120. Authentication module 120 is configured to generate authentication information, such as a digital signature. Housing module 110 may further comprise a sound component 130, an input unit 140 and an actuator 150. Although FIG. 1 shows the input unit 140 as a rectangular opening, input unit 140 may be implemented in various other shapes and/or sizes, as long as input unit 140 is configured to receive authentication module 120. Examples shapes of input unit 140 includes, but is not limited to, circular, triangular, other polygonal, and non-polygonal shapes. Also, input unit 140 may, for example, have a size of several millimeters to several inches, depending on housing module 110 and authentication module 120.

Similarly, authentication module 120 may be implemented in various other shapes, such as circular, polygonal and non-polygonal shapes, and/or sizes to couple input unit 140. Input unit 140 may be a slot, slit, notch, niche, compartment, receptacle, cradle or other open, partially open or fully enclosed area, opening, enclosure or enclosure, that is user accessible and is configured to removeably couple authentication module 120. Housing module 110 may also have a cover (not shown) that securely encloses authentication module 120 in input unit 140. Furthermore, housing module 110 may comprise additional elements such as an additional storage medium and processor (not shown) to control the receiving and transmitting of the authentication information Accordingly, authentication module 120 may be embedded or placed in housing module 110, namely input unit 140 of housing module 110, but is also removable from housing module 110. For example, a user may remove authentication module 120 from housing module 110 and place it in another housing module. Thus, authentication module 120 need not be integrated with housing module 110. When authentication module 120 is placed in housing module 110, authentication module 120 is configured to couple housing module 110. In this embodiment, authentication module 120 would be coupled to sound component 130. Sound component 130 is configured to emit sound tones associated with authentication information such as the digital signature. A user may activate or cause the housing module 110 to transmit authentication information through actuator 150. Actuator 150 may be, but is not limited to, a push-button, switch, knob or other user input device. Therefore, actuator 150 is configured to cause sound component 130 to emit the authentication information.

As described, authentication module 120 may be embedded in housing module 110 by various ways. It would be apparent to those skilled in the art that the position of sound component 130, input unit 140 and/or actuator 150 may be changed without affecting the operation of housing module 110 and authentication module 120. Also, it should be noted that the size and shape of housing module 110 may be changed without affecting the operation of apparatus 100.

In the description above, apparatus 100 is split into authentication module 120 that securely stores the cryptographic secret information for generating authentication information and into housing module 110 that acts as a container or shell for authentication module 120. Thus, housing module 110 is a replaceable, expandable and/or fungible module and provides a communication interface, such as sound component 130, that allows authentication module 120 to interact with the environment, such as a verifier's infrastructure that verifies the user of housing module 110. After verification, the identity of the user can be verified and/or the user may be granted access to private network or system. As a result, authentication module 120 is removeably coupled to a user replaceable module.

Splitting apparatus 100 as described lets a user, for example, to initially buy a simple and/or inexpensive module. The module can be replaced later with an entirely different module having different functions or a new upgraded module. Alternatively, the user may even downgrade from a complex and/or expensive module to a simple and/or inexpensive module. Still alternatively, as a container, various elements may be added and/or removed to and from the module to diversity and/or change the function of the module. The various elements may be plug-in modules that allow users to simply attach to the module for enabling certain functions.

Accordingly, housing module 110 may implement additional elements to have functions other than to enable transmission of authentication information. Examples of additional elements include, but is not limited to, a flashlight, key chain, bottle opener, display, monitor, television, camera, pager, persona data assistant, wireless or mobile phone, and other electronic as well as non-electronic gadgets. Note that once additional elements have been added, housing module 110 may also implement detachment of elements to disengage selective functions. As described, apparatus 100 becomes a multiple-function authentication device.

Figure 2:
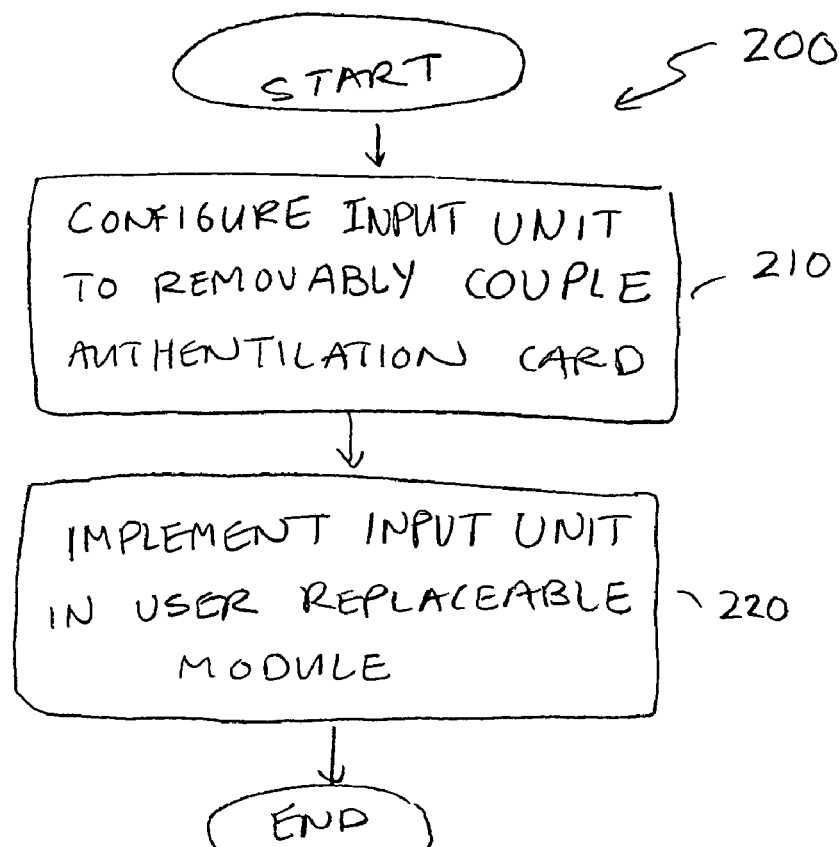
FIG. 2 shows an example embodiment of a method for authentication.

FIG. 2 shows an example method 200 for authentication by a digital signature verification. Method 200 comprises configuring (210) an input unit to receive and couple an external authentication module. The authentication module is configured to generate authentication information. The input unit is configured to removeably couple to the authentication module. The input unit is then implemented (220) in a user replaceable module that is configured to receive the authentication information and to transmit the authentication information. For example, the input unit may be implemented to transmit the authentication information by emitting sound tones associated with the authentication information. This allows a user to exchange or upgrade an entire housing module without exchanging or updating the authentication module. More particularly, the authentication module may be removed from one housing module and then inserted or plugged in to another housing module.

Figure 3:
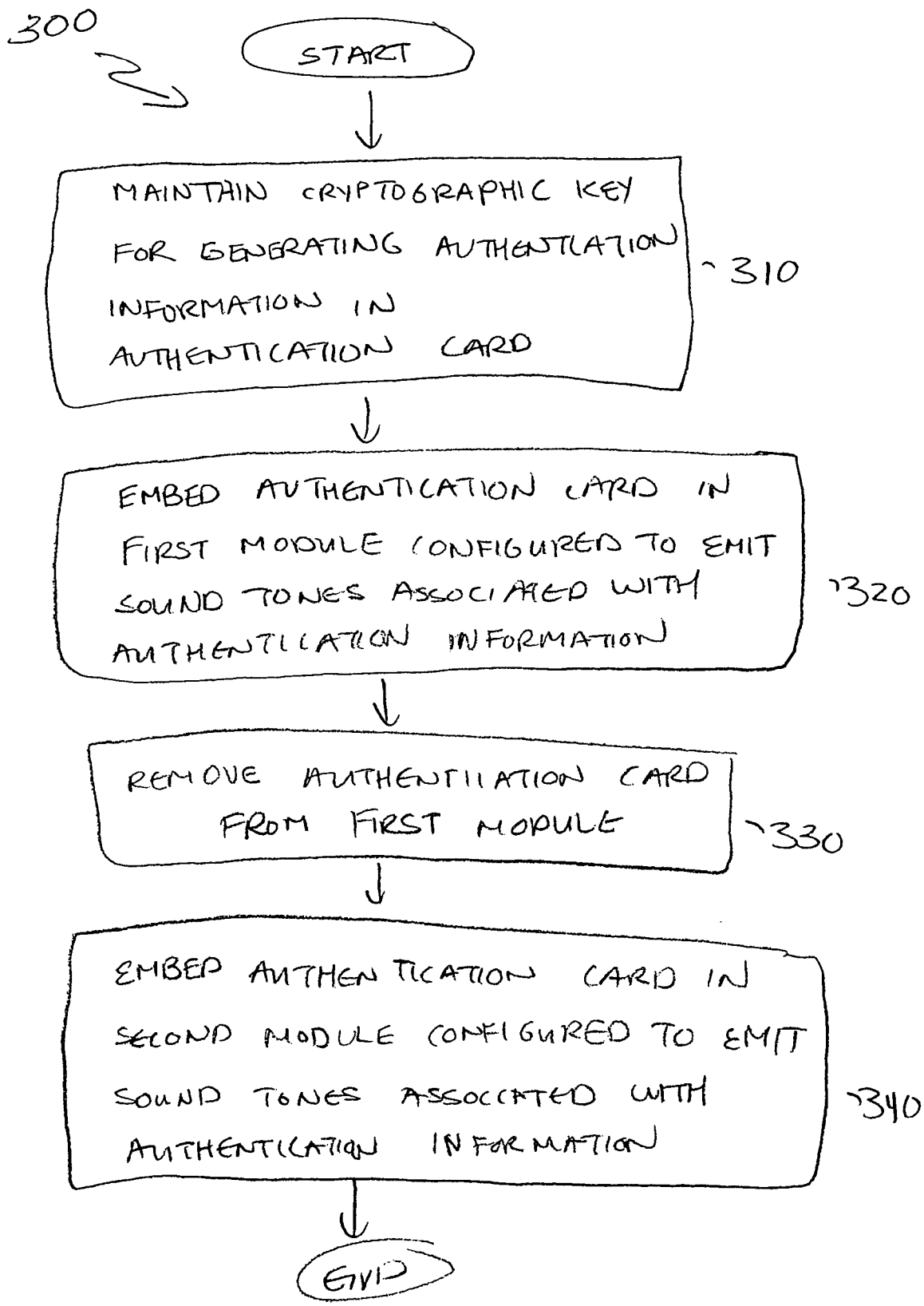
FIG. 3 shows an example embodiment of replacing a module for authentication.

FIG. 3 shows an example method 300 for exchanging or updating a module for authentication by a digital signature verification. Method 300 comprises maintaining (310) a cryptographic key that is to be used for generating authentication information, such as a digital signature, within an authentication module. The authentication module is embedded (320) in a first module to transmit authentication information, such as for example by emitting sound tones associated with the digital signature, wherein the authentication module is removable from the first module. Method 300 may further comprise removing (330) the authentication module from the first module and embedding (340) the authentication module in a second module configured to transmit authentication information, such as for example by emitting sound tones associated with the digital signature.

Authentication module 120 may be implemented based on a smart card, for example according to the standards defined in ISO/IEC 7816, or an integrated circuit card (ICC). The size of authentication module 120 may be small enough to embed in various modules. For example, housing module 110 may be either one or a combination of a security token, display, monitor, a pager, personal data assistant, and wireless or mobile phone. Housing module 110 may also function as a key chain, a flashlight, camera, television, a credit card or other devices, as long as a means for transmission of authentication information is available. As described above, in one embodiment, a sound component capable of generating sound tones may be implemented to transmit authentication information.

Figure 4:
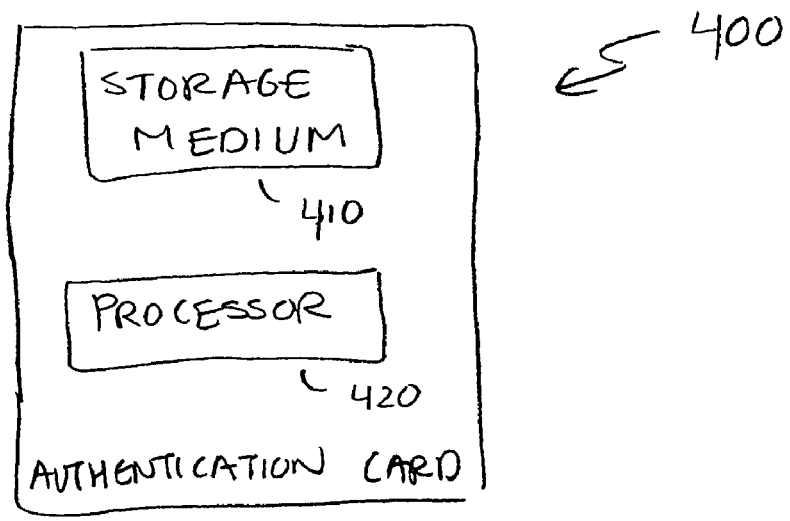
FIG. 4 is an example embodiment of an authentication module for the apparatus for authentication.

FIG. 4 shows an example embodiment of an external authentication module 300 that may be embedded in housing module 110 of FIG. 1. Authentication module 400 comprises a storage medium 410 configured to maintain a cryptographic key and a processor 420 coupled to storage medium 410. Processor 420 is configured to generate authentication information using the cryptographic key.

In one embodiment, processor 420 is configured to generate a digital signature using the cryptographic key. The digital signature may be generated based on any one of known techniques. For example, one technique for generating cryptographic signatures is public-key cryptography. In a public-key cryptography scheme, a user has both a private key and a public key for encrypting documents. The user encrypts a communication with the user's private key (i.e. the cryptographic key in public-key cryptography) and sends the encrypted communication to a targeted entity, which then decrypts the communication with the user's public key. If the targeted entity is able to decrypt the communication with the user's public key, the digital signature is authenticated as communication originating from the user.

Figure 5:
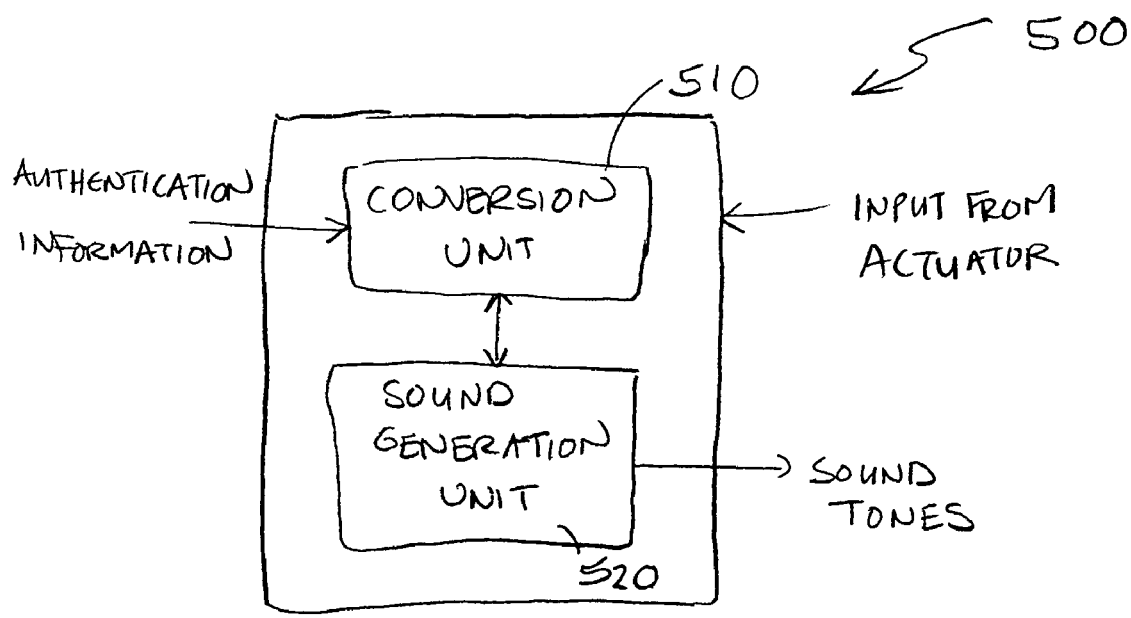
FIG. 5 shows an example embodiment of a sound component.

FIG. 5 shows an example embodiment of a sound component 500 that may be implemented in housing module 110. Sound component 500 may comprise a conversion unit 510 that may be coupled to input unit 140 and a sound generation unit 520 coupled to conversion unit 510. Conversion unit 510 may be configured to receive the digital signature and convert the digital signature into sound tones. Sound generation unit 520 may be configured to emit sound tones associated with the digital signature. In some embodiments, sound component 500 may comprise a sound reception unit (not shown) configured to receive an external signal. Furthermore, in some embodiments, the sound generation unit may be a speaker and the sound reception unit, if implemented, may be a microphone. In such case, the sound tones emitted by sound component 500 comprises audible tones.

In one embodiment, the external signal may be used in a challenge/response procedure, which will be described below. If implemented, the external signal is converted into data for generating authentication information. The conversion may be performed by conversion unit 510 or a second conversion unit may be implemented for converting the external signal. The data is then forwarded to authentication module 120 and authentication module 120 uses the data to generate the authentication information.

It is an advantage when audible tones are generated to uniquely represent a digital signature. Almost all desktop and laptop computers currently integrate microphones into the computer system and almost all desktop and laptop computers carry the capability to generate sounds. Hence, apparatus 100 can be advantageously implemented to operate with desktop and laptop computers running the appropriate software. In addition, apparatus 100 can be used with various communication systems that is capable of carrying audible tones. Examples include, but are not limited to telephone networks, building intercom systems, and radio communication networks. Therefore, apparatus 100 may be used for authentication directly in a face-to-face transaction or indirectly through an acoustic communication medium.

Alternatively, the sound tones emitted by sound component 130 may comprise infrasonic tones and/or ultrasonic tones. In addition, the functionality of sound component 130 can be supplemented with means for generating and outputting infrared signal such as an infrared port. Various laptop computer manufacturers, printer manufacturers, and PDA manufacturers have incorporated infrared ports into their equipment. An infrared port may be used advantageously in those circumstances where the use of a sound component would be awkward and undesirable, such as in a public place. Alternatively, the generation and/or outputting of infrared frequencies can be made by an add-on device that works in conjunction with housing module 110.

Moreover, sound component 130 may also comprise a modulator that converts a digital signature into sound tones. The digital signature may be converted based on any known modulation techniques, including, but not limited to Dual Tone Multi-Frequency (DTMF) and Frequency Shift Keying (FSK). For example, co-pending U.S. application Ser. No. 10/356,144 and U.S. application Ser. No. 10/356,425 disclose modulation techniques to encode digital data into sound waves.

Referring back to FIG. 1, authentication module 120 may be programmed to carry multiple keys that would identify an individual to multiple entities. For example, authentication module 120 can be programmed to generate an audible signature that would identify the holder of housing module 110 to a financial institution over a telephone line. Authentication module 120 can also be programmed to generate a second audible signature that would identify the holder of housing module 110 to a computer network over a microphone hooked up to a computer in the network. The same authentication module 120 can be programmed to generate still a third audible signature to a proximity card reader in order to gain access to a secure building.

Thus, storage medium 410 may maintain a plurality of cryptographic keys and processor 420 may generate a digital signature from one of the plurality of cryptographic keys. Here, each one of the plurality of digital signature that corresponds to each one of the plurality of cryptographic keys would have unique sound tones associated with the digital signature. Different digital signatures may then be used for performing different authentication.

Figure 6:
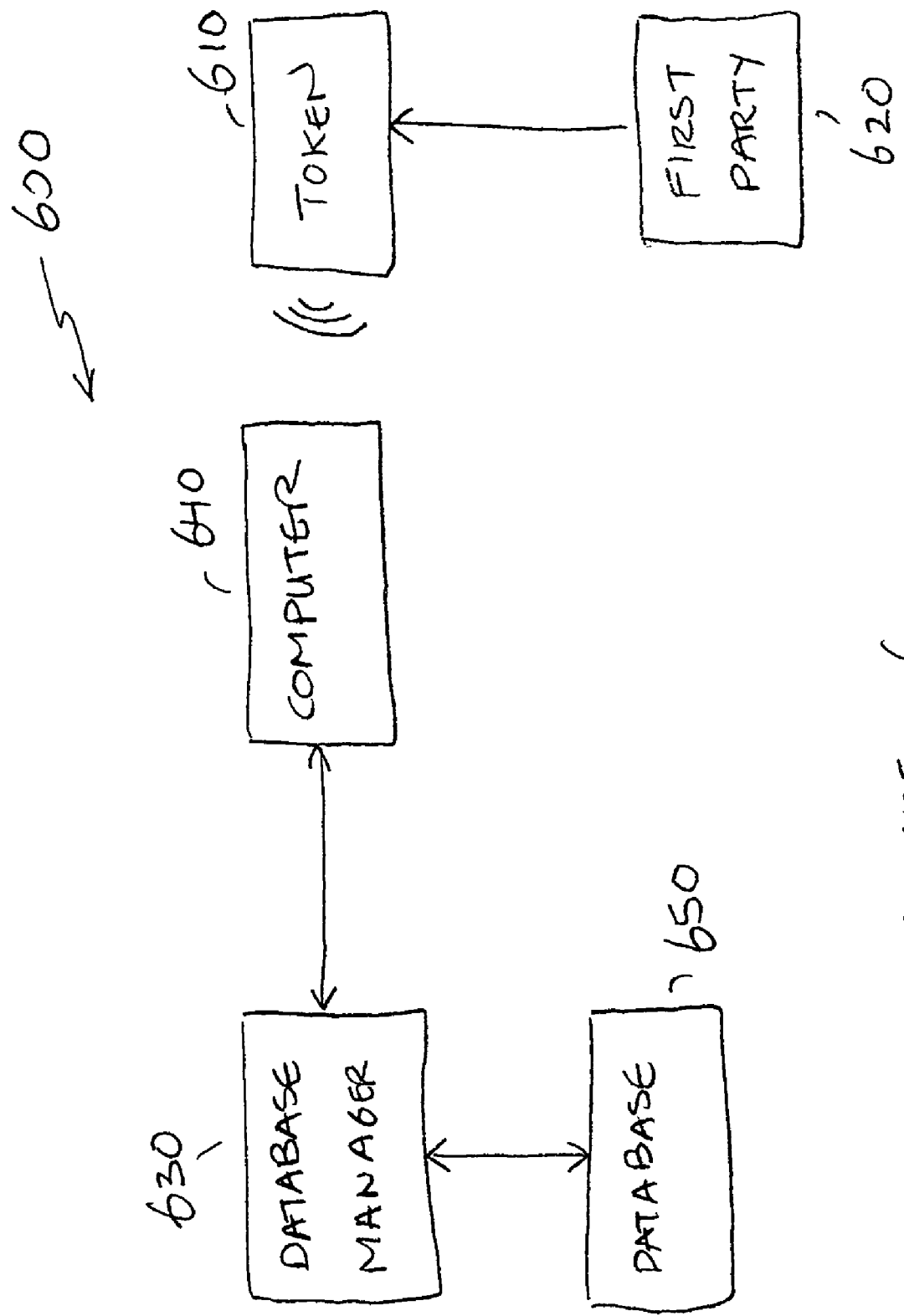
FIG. 6 shows an example embodiment of a system for authentication.

FIG. 6 is a block diagram of an example authentication system 600 between an individual and verifier such as a database manager, wherein a security token implemented as module 610 is used to authenticate the identity of the individual. For purposes of explanation, assume that a first party 620 intends to access information protected by a database manager 630. First party 620 holds or places token 610 in proximity to a microphone (not shown) coupled to a computer 640, such that computer 640 is in communication with database manager 630. Token 610 generates or emits audible tones that represent an authentication information. The tones are then transmitted by computer 640 to database manager 630. Database manager 630 verifies the identity of first party 620 by retrieving authentication information from a database 650. First party 620 can then proceed with a desired transaction.

In alternative embodiments, the freshness of a signature can be ensured through a challenge/response procedure chosen by database manager 630, wherein the signature is generated in response to a challenge from database manager 630. Thus, token 610 can generate cryptographic signatures in response to a signal from an external source. In such case, sound component of token 610 comprises a sound generation unit and a sound reception unit, so that token 610 can detect audible tones from the speakers of computer 650. Token 610 may also have other elements as described below with reference to housing module 110 of FIG. 1.

Namely, in addition to sound component 130, housing module 110 may comprise a power source (not shown) configured to provide power to authentication device 120 and a second processor (not shown) configured to control sound component 130. Housing module 110 may further comprise another form of input element, such as a parallel port, a serial port, or a universal serial bus. Similarly, housing module 110 may also comprise an output element for communication. This allows housing module 110 to interact with another entity through means other than by sound generation. For example, the sound component may be engaged for authentication functions and an output element can be engaged for data transfers, such as the backup of the cryptographic signatures onto a personal computer or the exchange of public key information.

In some embodiments, an activation requirement can be programmed into housing module 110, so that another party may not use housing module 110 fraudulently or accidentally. For example, a user interface can be incorporated with housing module 110 such that an activation check can be performed. Here, authentication module 120 will not generate a digital signature unless a confirmation is received by housing module 110 as to the identify of the holder. It should be noted that housing module 110 may generate sound tones as part of a protocol interaction even though the token may ultimately refuse to generate an audible authentication signature. Confirmation can come in the form of a PIN entered into a keypad. Alternatively, confirmation can be determined from a voice print, wherein the user interface is a microphone and housing module 110 has sufficient processing ability to enable voice recognition. Voice recognition methods are well known in the art and will not be discussed in detail herein.

Another way to activate a token that has a microphone input would be to use a Dual Tone Multi-Frequency (DTMF) device to input the activation code. This has the advantage of requiring little processing complexity and requiring an inexpensive and commonly available DTMF sound generator (such as a telephone). Furthermore, as an added security precaution, housing module 110 can be programmed to become inactive if too many attempts are made to input the activation code.

In still other embodiments, the functionality of sound component 130 can be supplemented with an infrared port. Various laptop computer manufacturers, printer manufacturers, and PDA manufacturers have incorporated infrared ports into their equipment. An infrared port may be used advantageously in those circumstances where the use of a sound component would be awkward and undesirable, such as in a public place. Similarly, sound component 130 can generate ultrasonic frequencies. Alternatively, the generation of ultrasonic frequencies can be made by an add-on device that works in conjunction with the exemplary embodiment. Such an add-on device would be connected to the exemplary embodiment through audible tones or through an output element.

Thus, embodiments for performing authentication through the use of sound tones have been described. However, it should again be noted that techniques, other than emission of sound tones, may be implemented to transmit authentication information. Therefore, any known techniques to transmit authentication may be applied to the embodiments described above without departing from the spirit and scope of the invention. More particularly, any known transmitter, transceiver or output unit configured to transmit the authentication information may be implemented in lieu of sound component 130. Examples of output units, other than sound component 130, may be an infrared port, a radio transmitter/transceiver and a telecommunication transmitter/transceiver.

More particularly, by splitting allowing a user replaceable module for performing authentication, a user may easily exchange, modify or upgrade the module while maintaining the same authentication module By maintaining the authentication module, the user may continue to use same unique cryptographic information in the authentication module for authentication. This allows users to avoid the inconvenience of re-establishing and/or updating relationships with verifiers for authentication.

Furthermore, it should be noted that the foregoing embodiments are merely examples and are not to be construed as limiting the invention. For example, authentication module 120 can be configured to implement any one of the various cryptographic schemes that are available. Moreover, although some of the embodiments have been described with reference to digital signature, the scope of the invention is also applicable to other authentication information such as passwords, PINs or other access codes. Accordingly, the description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. Apparatus for performing authentication using a removable external authentication module, wherein the authentication module is configured to generate authentication information, the apparatus comprising:
   an input unit configured to receive the removable authentication module; and
   an output unit coupled to the input unit, configured to receive the authentication information from the removable authentication module and to transmit the authentication information, wherein the output unit includes a sound component configured to receive the authentication information from the authentication module and to emit sound tones associated with the authentication information.

2. The apparatus of claim 1, wherein the apparatus comprises:
   a housing module comprising the input unit and the output unit.

3. The apparatus of claim 1, wherein the sound component comprises:
   a conversion unit coupled to the input unit, configured to receive the authentication information and convert the authentication information into sound tones; and
   a sound generation unit coupled to the conversion unit, configured to emit sound tones associated with the authentication information.

4. The apparatus of claim 3, wherein the sound component further comprises:
   a sound reception unit coupled to the conversion unit, configured to receive an external signal; and
   wherein the conversion unit is configured to convert the external signal into data used for generating the authentication information.

5. The apparatus of claim 1, wherein the sound tones comprises audible tones.

6. The apparatus of claim 1, wherein the sound tones comprises infrasonic tones.

7. The apparatus of claim 1, wherein the sound tones comprises ultrasonic tones.

8. The apparatus of claim 1, wherein the authentication information comprises a digital signature.

9. The apparatus of claim 1, wherein the authentication information comprises an access code.

10. The apparatus of claim 1, wherein the module further comprises a display.

11. The apparatus of claim 1, wherein the authentication information is pre-associated with a user.

12. An apparatus for performing authentication using authentication information received from an external authentication module, wherein the authentication module is configured to generate the authentication information, the module comprising:
    an input unit configured to receive and removeably couple to the authentication module;
    an output unit coupled to the input unit, configured to receive the authentication information and to transmit the authentication information, wherein the output unit includes a sound component configured to receive the authentication information, convert the authentication information into sound tones, and to emit sound tones associated with the authentication information; and
    an actuator coupled to the output unit, configured to cause the output unit to transmit the authentication information.

13. The module of claim 12, wherein the sound component comprises:
    a conversion unit coupled to the input unit, configured to receive the authentication information and convert the authentication information into sound tones; and
    a sound generation unit coupled to the conversion unit, configured to emit sound tones associated with the authentication information.

14. The module of claim 13, wherein the sound component further comprises:
    a sound reception unit coupled to the conversion unit, configured to receive an external signal; and
    wherein the conversion unit is configured to convert the external signal into data used for generating the authentication information.

15. The module of claim 12, wherein the sound tones comprises audible tones.

16. The module of claim 15, wherein the sound component comprises:
    a conversion unit coupled to the input unit, configured to receive the authentication information and convert the authentication information into sound tones; and
    a speaker coupled to the conversion unit, configured to emit sound tones associated with the authentication information.

17. The module of claim 16, wherein the sound component further comprises:
    a microphone coupled to the conversion unit, configured to receive an external signal; and wherein the conversion unit is configured to convert the external signal into data used for generating the authentication information.

18. The module of claim 12, wherein the sound tones comprises infrasonic tones.

19. The module of claim 12, wherein the sound tones comprises ultrasonic tones.

20. The module of claim 12, wherein the authentication information comprises a digital signature.

21. The module of claim 12, wherein the authentication information comprises an access code.

22. A method for performing authentication using removeably coupled external authentication module configured to generate user authentication information, the method comprising:
   configuring an input unit to receive and couple the removable, external authentication module;
   receiving user authentication information from the removable, external authentication module; and
   transmitting the user authentication information by emitting sounds tones associated with the authentication information.

23. The method of claim 22, wherein the sound tones comprises audible tones.

24. The method of claim 22, wherein the sound tones comprises infrasonic tones.

25. The method of claim 22, wherein the sound tones comprises ultrasonic tones.

26. The method of claim 22, wherein the authentication information comprises a digital signature.

27. The method of claim 22, wherein the authentication information comprises an access code.

28. An apparatus for performing authentication using authentication information received from a removable, external authentication module, wherein the authentication module is configured to generate the authentication information, the module comprising:
   means for removeably coupling to the authentication module;
   means for receiving the user authentication information; and
   means for transmitting the user authentication information including means for converting the authentication information into sound tones, and means for emitting sound tones associated with the authentication information.

29. The module of claim 28, further comprising:
   means for receiving an external signal; and
   means for converting the external signal into data used for generating the authentication information.

30. The module of claim 28, wherein the authentication information comprises a digital signature.

31. The module of claim 28, wherein the authentication information comprises an access code.

32. A user removable apparatus for removeably coupling to an authentication module, the authentication module having a conversion unit, wherein the conversion unit is configured to receive user authentication information and to emit sound tones associated with the user authentication information, the removable apparatus comprising:
   means for removeably coupling and sending the authorization information to the authentication module;
   means for maintaining a cryptographic key; and
   means for generating the user authentication information using the cryptographic key.

33. Apparatus for performing authentication using removeably coupled external authentication module, wherein the authentication module is configured to generate user authentication information, the method comprising:
   means for configuring an input unit to receive and couple the removeably coupled, external authentication module; and
   means for implementing the input unit in a user replaceable module configured to receive the user authentication information and to emit sound tones associated with the user authentication information.

34. Apparatus for performing authentication using removeably coupled external user authentication module, wherein the user authentication module is configured to generate a digital signature, the apparatus comprising:
   an input unit configured to receive and couple the removable, external user authentication module; and
   a sound component configured to receive the digital signature from the removable, external authentication module and to emit sound tones associated with the digital signature.

35. An apparatus for performing user authentication using a digital signature received from an external user authentication module, wherein the external user authentication module is configured to generate the digital signature, the module comprising:
   an input unit configured to receive and removeably couple to the user authentication module;
   a sound component coupled to the input unit, configured to receive the digital signature, convert the digital signature into sound tones, and to emit sound tones associated with the digital signature; and
   an actuator coupled to the conversion unit and the sound component, the actuator configured to cause the sound component to emit the sound tones.

36. A method for performing authentication using a removeably coupled external authentication module configured to generate a digital signature, the method comprising:
   configuring an input unit to receive and couple the removable, external authentication module;
   receiving a digital signature from the removable, external authentication module; and
   emitting sound tones associated with the digital signature.

* * * * *